United States Patent [19]

Thunholm

[11] 4,143,837
[45] Mar. 13, 1979

[54] CONTROL DEVICE FOR MISSILE OR THE LIKE

[75] Inventor: Carl H. G. Thunholm, Karlskoga, Sweden

[73] Assignee: AB Bofors, Bofors, Sweden

[21] Appl. No.: 798,554

[22] Filed: May 19, 1977

[30] Foreign Application Priority Data

Jun. 8, 1976 [SE] Sweden .............................. 7606418

[51] Int. Cl.² .......................... F42B 13/30; F02K 1/20
[52] U.S. Cl. ...................................... 244/3.22; 60/230; 239/265.19
[58] Field of Search .......................... 244/3.22; 60/230; 239/265.19

[56] References Cited

U.S. PATENT DOCUMENTS

| 2,694,898 | 11/1954 | Stauff | 239/265.37 |
| 2,879,955 | 3/1959 | Zborowski | 244/3.22 |
| 3,384,325 | 5/1968 | Hermann | 244/3.22 |

FOREIGN PATENT DOCUMENTS 1132804  7/1962  Fed. Rep. of Germany ...... 239/265.19

OTHER PUBLICATIONS

Flight, Solid-Propellant Motors, p. 42, Jan. 13, 1961.

*Primary Examiner*—Verlin R. Pendegrass
*Attorney, Agent, or Firm*—Pollock, Vande Sande & Priddy

[57] ABSTRACT

A spoiler control assembly for deflecting a stream of propelling gas to pass through an exhaust nozzle of a motor drive missile type device, wherein the spoiler control assembly includes at least one spoiler blade attached for joint rotation with a turning shaft mounted within the missile. The spoiler blade is positioned adjacent an end surface of the nozzle and is inclined at a predetermined acute angle relative to a plane extending directly across an opening of the nozzle, with the shaft being selectively rotated to extend a portion of the spoiler blade into the stream of propelling gas.

7 Claims, 6 Drawing Figures

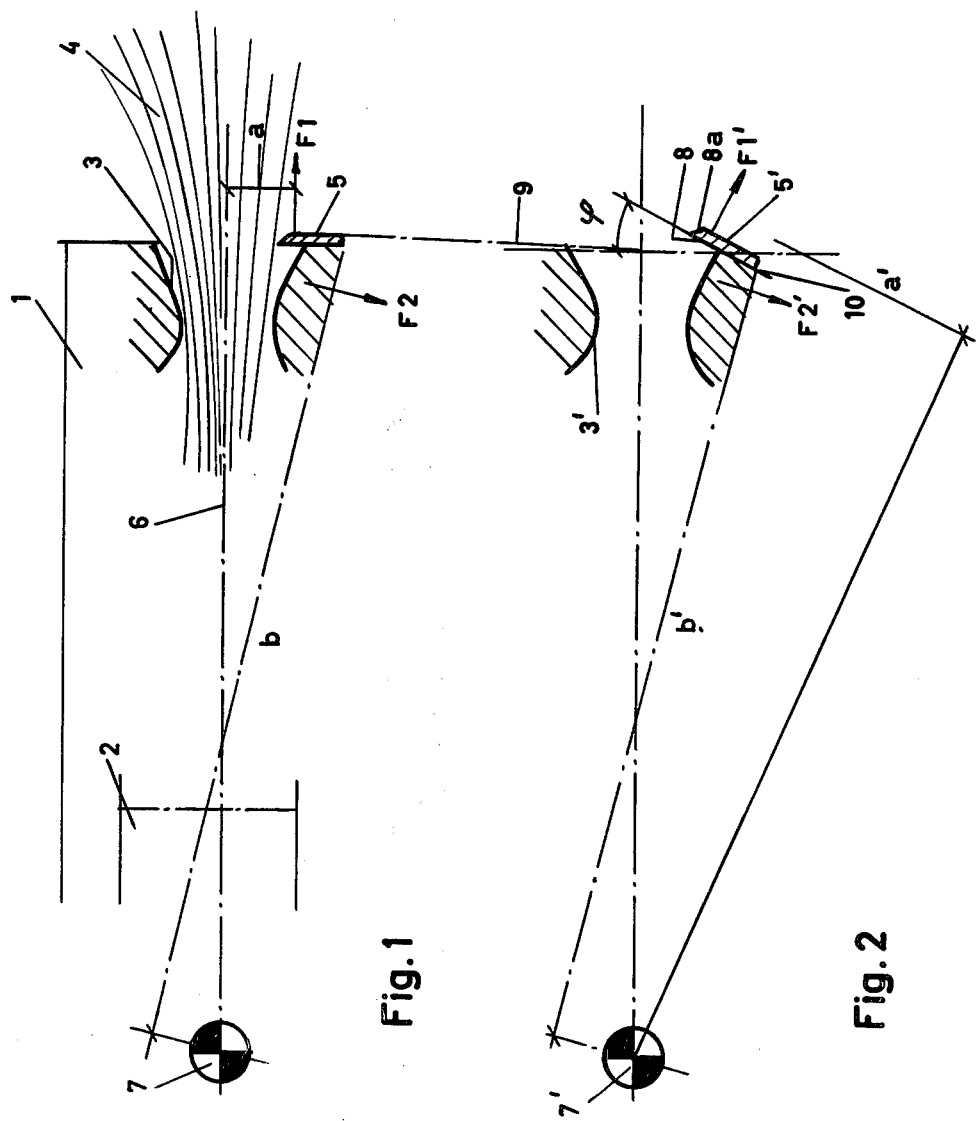

CONTROL DEVICE FOR MISSILE OR THE LIKE

BACKGROUND OF THE INVENTION

The present invention relates to a control device for a ballistic unit, such as a missile of the type including a motor that generates a propelling gas and which also includes a motor nozzle. The control device may comprise at least one spoiler which can be moved in and out of the flow of propelling gas at the exhaust opening of the nozzle.

By moving, the spoiler into the jet of propelling gas flowing from the nozzle the gas flow from the nozzle is influenced, resulting in deflection of the thrust vector of the jet of propelling gas. This is a known method of achieving a desired control moment in a missile or the like. It is known to arrange the interfering body or spoiler blade in question so that it travels at right angles to the centre axis of the motor nozzle at the exhaust opening of the nozzle. It is also known to have the interfering body supported on a rotatable shaft which is parallel to or at right angles to the centre axis of the nozzle, which allows the interfering body to be moved into or out of the gas flow path with comparatively small movements. The members (servos, electromagnets, etc.) required for the operation of the interfering body or the spoiler can therefore be made simple, light and relatively inexpensive.

However, a disadvantage of know arrangements is that the angle of deflection is limited to not more than 15° and the effective thrust of the propelling motor is considerably reduced, particularly at large angles of deflection (the maximum deflection angles). These disadvantages result from the interfering body giving rise to two counteracting moments around the missiles centre of gravity.

OBJECTS AND SUMMARY OF THE PRESENT INVENTION

The present invention is directed towards these problems comfronting known control devices, and according to the present invention a control device includes an interfering body or spoiler blade arranged at a predetermined angle $\phi$ in relation to an end plane extending through the exhaust opening of the motor nozzle. This achieves two different moments which coact to turn the missile or the like around its centre of gravity. The invention is also directed towards eliminating space problems, particularly from the point of view of diameter, which are encountered by known devices.

A distinguishing feature of the control device according to the present invention is that the spoiler is arranged with a surface facing the outgoing flow of propelling gas which is set obliquely at a predetermined angle in relation to an end plane through the exhaust opening of the motor nozzle.

BRIEF DESCRIPTION OF THE DRAWINGS

A preferred embodiment of a control device constructed according to the present invention will be described in detail hereafter, with reference being made to the accompanying drawings, in which FIG. 1 shows a schematic representation of a known spoiler arrangement for a missile;

FIG. 2 shows a schematic representation of a spoiler arrangement for a missile in accordance with the present invention.

DETAILED DESCRIPTION OF THE PREFERRED EMBODIMENT

Figure 3C:
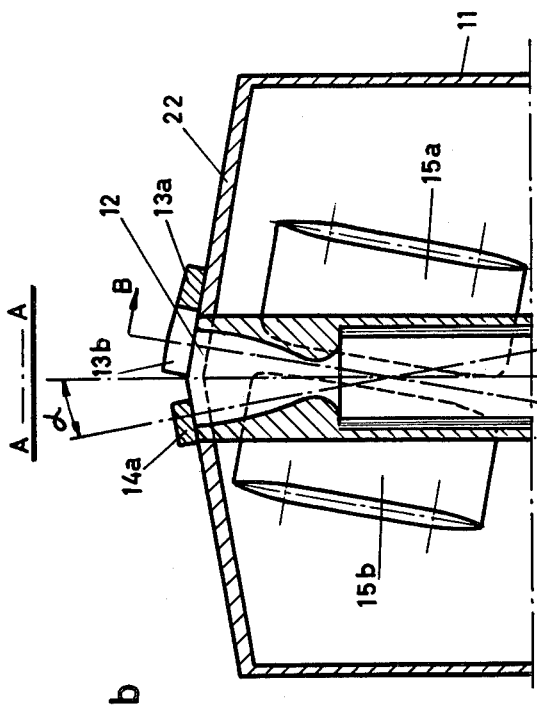
FIGS. 3a–3d show sectional views of the spoiler constructed according to the present invention.

Referring to FIG. 1, a portion of a missile or the like is schematically represented and is designated 1. Missile 1 is provided with a motor 2 of the powder motor type, and includes a fixed motor nozzle which is 3. The motor 2 is assumed to generate propelling gases which are emitted from the exhaust opening of nozzle 3 as a propelling gas jet 4.

Positioned in a rear plane of the missile is a spoiler blade 5 which is arranged to be moved into the nozzle exhaust at right angles to the centre axis of the motor nozzle (and of the missile). While a single spoiler blade is shown, there can, of course, also be two, three, four or more spoiler blades. The centre of gravity of the missile is located at the numeral 7.

The spoiler blade 5 is arranged so that it can be moved into or out of the propelling gas flow 4. The spoiler blade 5 should appropriately be arranged rotatably between two end positions, including a fully moved-in position, as shown by FIG. 1, and a moved-out position, in which no part of spoiler blade 5 is in contact wth the propelling gas flow 4. In the moved-out end position, the thrust vector of the propelling gas flow 4 coincides with the centre line 6. In the moved-in position of the spoiler blade 5 as shown in FIG. 1, however, two forces arise. One is caused by a force F1 directed straight rearwardly the spoiler blade 5, while force F2 is directed obliquely into the wall of nozzle 3. The force F1 has a moment arm a which gives rise to a first moment F1 · which strives to turn the missile 1 around the centre of gravity 7 in the counter-clockwise direction in FIG. 1. The force F2 has a moment arm b which gives rise to a second moment F2 · which strives to turn the missile around the centre of gravity 7 in the clockwise direction in FIG. 1. The force F1 also reduces the thrust of the propelling motor 2, while the force F2 gives a minor addition of thrust. Usually, the forces F1 and F2 are generally of the same magnitude, while the moment, arms a and b differ from each other considerably. A moment resulting from the combination of forces F1 and F2 achieves an overall deflection of the thrust vector.

Referring now to FIG. 2, the parts corresponding to those shown in FIG. 1 and which are directly concerned with the invention include a spoiler blade 5' which has been set obliquely, so that a surface 8 facing the outgoing propelling gas jet 4, assumes an angle $\phi$ in relation to an end plane 9 extending through the exhaust opening of the motor nozzle when moved into exhaust jet 4. A force F1' is created, which extends obliquely in relation to the force F1 shown in the configuration according to FIG. 1. The direction of the force F1' means that a moment arm a' assumes a direction which gives rise to a moment F1' · a', which strives to turn the missile around the centre of gravity 7' in the clockwise direction. This moment will thus coact with a second moment F2' · b', which also has a clockwise direction, thereby giving rise to an increased deflection of the thrust vector of the propelling gas jet 4. The direction of the force F1' also reduces the adverse reduction of thrust discussed in connection with the configuration according to FIG. 1.

It is considered within the scope of the present invention to provide one, two, three or more spoiler blades 5.

In order that the moment required to move spoiler blade 5' into and out of the gas flow paths shall not be increased as compared to the known system according to FIG. 1, a novel turning shaft, which will be described in more detail hereafter is arranged in the same plane including the force F1'.. According to the preferred embodiment, the angle φ can have values within 5°–45°, and should particularly be chosen with a value within the range of 10°–20°.

In order that the effectiveness of the spoiler 5 shall not be reduced by creation of too large a space between the nozzle 3 and the spoiler blade 5', the rear edge of the nozzle 3 or the outer surface 10 is chamfered obliquely in a plane parallel to a surface 8, which is the up-stream surface of blade 5'. Further, the spoiler blade is made with an oblique chamfer 8a.

Figure 3B:
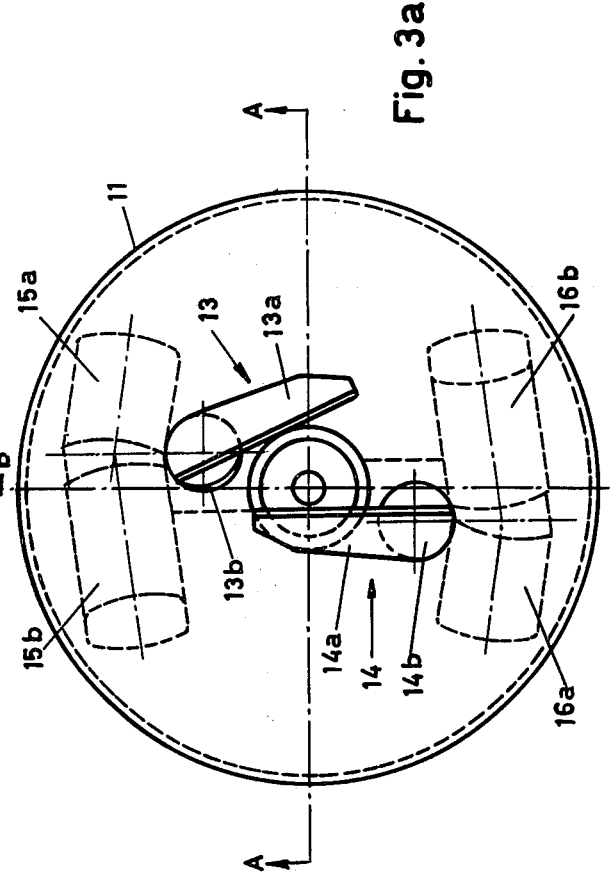
Figure 3D:
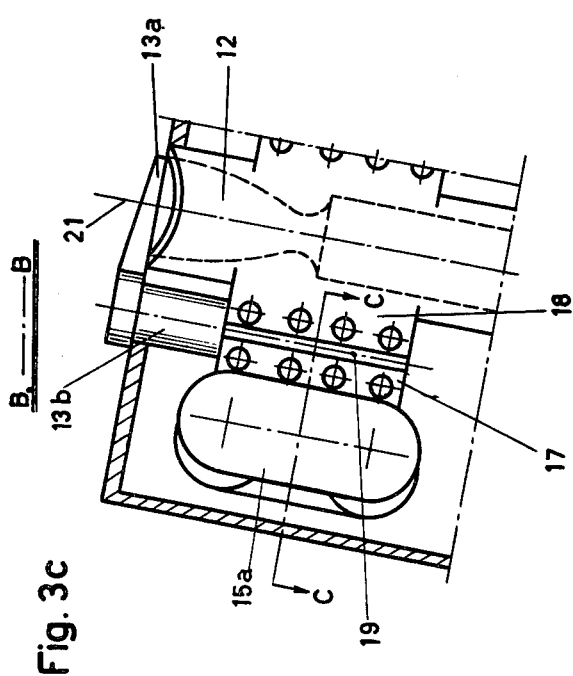
Figure 3A:
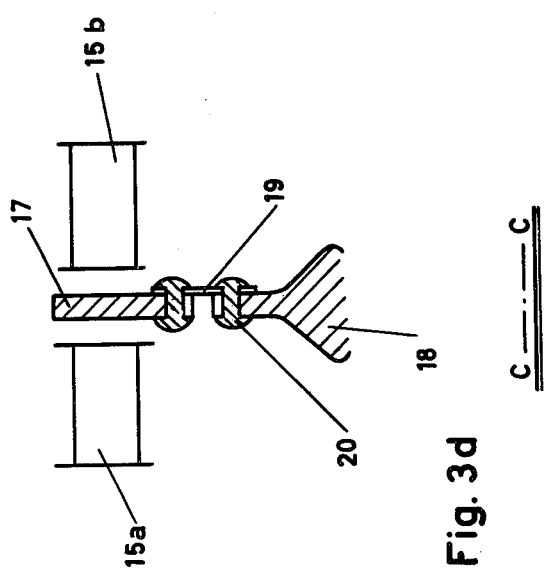

FIGS. 3a–3c are intended to show the structure of a preferred embodiment of the present invention as relating to a missile 11, which in the figures in question is represented by its rear section. In the figures, a nozzle is designated 12. In the preferred embodiment, two spoilers 13 and 14 are utilized, of which spoiler 13 is shown in a position moved out of the propelling gas jet, and spoiler 14 in a position moved into the propelling gas jet. The spoilers 13, 14 each comprise a spoiler blade 13a, 14a and an attached turning shaft designated 13b, 14b respectively.

Movement of spoilers 13, 14 is controlled by actuating members in the form of pairs of electromagnets 15a, 15b and 16a, 16b, respectively, the turning shafts 13a, 14b, being rotatably arranged by means of the electromagnets. The electromagnets forming pairs 15a, 15b and 16a, 16b, respectively, are arranged in spaced relation to each other, with. The turning movement of each respective turning shaft 13b and 14b being achieved by means of an armature 17 for each turning shaft. The armature, 17 is rotatably supported in a part of the missile frame 18 by means of a band hinge 19 and extends into the space between the magnets forming the respective pairs of electromagnets. The band hinge 19 may be fastened to the frame 18 and the armature with rivets 20, screws, or the like. The turning shaft 13b is then arranged relative to the armature 17 for transmitting the movement of armature 17 to the spoiler blade 13a. The armature 17 is attracted by the magnet in the pair of electromagnets 15a and 15b which is activated in each case. Depending upon which of the magnets in the pair of electromagnets activated, and thus depending on what position the armature is in because of the magnet activation, the turning shaft 13b and the blade 13a in the spoiler 5' assumes either of the two end positions. This function is known in itself, and the invention is not concerned with this.

The turning shafts 13b, 14b are each inclined with an angle α in relation to the centre axis 21 of the motor nozzle 12 as shown in a first cross-section, according to FIG. 3b, while in a second cross-section according to FIG. 3c, taken 90° in relation to the cross-section according to FIG. 3b; turning 13b is in a plane which is parallel to a plane including the centre axis 21 of the motor nozzle. The angle α corresponds to the angle φ in the above, which means that each turning shaft 13b, 14b in its respective spoiler is arranged at right angles to its spoiler blade 13a and 14a, respectively.

Each respective turning shaft 13b and 14b extends through a recess formed in the rear wall of the missile or the rear plane 22, with the portions of the turning shaft extending beyond the rear plane 22 functioning as a head to which the spoiler blade 13a, 14a is fastened.

Each spoiler blade 13a, 14a is in contact with one of its sides which supports the surface that can be turned towards the propelling gas jet towards the outside of the rear plane which has an inclination corresponding to the angle α in relation to an end plane through the exhaust opening of the motor nozzle. The contact results in a small space being formed between the side of the spoiler blade 13a, 14a and the outside at the motor nozzle along the rear surface 22, and the small space means, in turn, that only small quantities of propelling gas will find their way between the spoiler blade 13a, 14a and the outside surface of the rear plane 22.

In accordance with FIG. 3c, the spoiler blade 13a tapers in cross-sectional shape from its connection with turning shaft 13b.

The invention is not limited to the embodiment shown above as an example, but can be subject to modification within the scope of the following claims.

I claim:

1. A spoiler control assembly for deflecting a stream of propelling gas flowing through an exhaust nozzle of a motor powered missile type device, and comprising:

at least one spoiler blade having first and second respective end portions, said spoiler being positioned adjacent a rear end surface of said exhaust nozzle with said spoiler blade extending at a predetermined acute angle with respect to a plane passing directly through an opening in said exhaust nozzle;

a shaft for rotation about an axis extending axially therethrough and mounted within said missile device and inclined at a further acute angle to a center axis extending through said exhaust nozzle;

said shaft having an end portion directly attached to said first end portion of said spoiler blade for joint rotation therewith; and means for rotating said shaft and said spoiler to extend a portion of said spoiler into said stream of propelling gas causing deflection thereof.

2. A spoiler control assembly according to claim 1, wherein a plurality of separate rotatable shafts are each mounted within said missile, each shaft being attached to an end portion of a separate spoiler blade positioned adjacent to said rear end surface of said nozzle.

3. A spoiler control assembly according to claim 2, wherein each spoiler blade is formed of a cross-sectional shape which tapers from said end attached to said shaft inwardly toward an opposite end of said spoiler blade.

4. A spoiler control assembly according to claim 1, wherein said predetermined acute angle has a value within a range of 5°–45° there inclusive.

5. A spoiler control assembly according to claim 1, wherein said predetermined acute angle has a value within a range of 10°–20° there inclusive.

6. A spoiler control assembly according to claim 1, wherein said means comprises a pair of electromagnets positioned on opposite sides of an armature assembly mounted in said missile and attached for joint rotation with said shaft;

whereby selective actuation of said electromagnet causes deflection of said armature and a corresponding rotation of said shaft and attached spoiler blade.

7. A spoiler control assembly according to claim 1, wherein said spoiler blade extends parallel to and contacts an obliquely extending portion of said rear end surface of said exhaust nozzle.

* * * * *